United States Patent
Sethi et al.

(10) Patent No.: US 12,190,082 B2
(45) Date of Patent: Jan. 7, 2025

(54) AUTOMATED GENERATION OF ADDITIONAL VERSIONS OF MICROSERVICES

(71) Applicant: Dell Products L.P., Round Rock, TX (US)

(72) Inventors: Parminder Singh Sethi, Ludhiana (IN); Shibi Panikkar, Bangalore (IN)

(73) Assignee: Dell Products L.P., Round Rock, TX (US)

( * ) Notice: Subject to any disclaimer, the term of this patent is extended or adjusted under 35 U.S.C. 154(b) by 318 days.

(21) Appl. No.: 17/544,016

(22) Filed: Dec. 7, 2021

(65) Prior Publication Data

US 2023/0176837 A1    Jun. 8, 2023

(51) Int. Cl.
*G06F 8/36*     (2018.01)
*G06F 8/60*     (2018.01)
*G06F 8/73*     (2018.01)
*G06N 5/02*     (2023.01)

(52) U.S. Cl.
CPC ............. *G06F 8/36* (2013.01); *G06F 8/60* (2013.01); *G06F 8/73* (2013.01); *G06N 5/02* (2013.01)

(58) Field of Classification Search
CPC .... G06F 8/36; G06F 8/60; G06F 8/73; G06N 5/02

See application file for complete search history.

(56) References Cited

U.S. PATENT DOCUMENTS

| 6,851,105 B1 * | 2/2005 | Coad ..................... G06F 8/36 |
| | | 717/109 |
| 2003/0028867 A1 * | 2/2003 | Kryloff ................. G06F 8/658 |
| | | 717/171 |
| 2011/0276833 A1 * | 11/2011 | Otenko ................ G06F 11/366 |
| | | 714/E11.208 |

(Continued)

OTHER PUBLICATIONS

Perkins et al., "Automatically patching errors in deployed software," 2009 [retrieved on Mar. 15, 24], Proceedings of the ACM SIGOPS 22nd symposium on Operating systems principles, pp. 87-102, <url>:https://dl.acm.org. (Year: 2009).*

(Continued)

*Primary Examiner* — S. Sough
*Assistant Examiner* — Stephen D Berman
(74) *Attorney, Agent, or Firm* — Ryan, Mason & Lewis, LLP

(57) ABSTRACT

An apparatus comprises at least one processing device configured to detect one or more issues associated with execution of a first version of a microservice in one or more computing environments, to determine whether any of the detected issues correspond to one or more triggers of one or more predefined patterns in a knowledge base, and, responsive to determining that at least one of the detected issues corresponds to at least one of the triggers of at least one of the predefined patterns in the knowledge base, to utilize code modification data structures specified in the at least one predefined pattern to modify source code of the microservice. The processing device is further configured to generate at least one additional version of the microservice utilizing the modified source code, and to deploy the at least one additional version of the microservice in at least one of the computing environments.

20 Claims, 17 Drawing Sheets

(56) References Cited

U.S. PATENT DOCUMENTS

| | | | | |
|---|---|---|---|---|
| 2015/0363294 | A1* | 12/2015 | Carback, III | G06F 8/70 |
| | | | | 717/132 |
| 2016/0357660 | A1* | 12/2016 | Dean | G06F 8/00 |
| 2019/0095197 | A1* | 3/2019 | Ross | G06F 8/71 |
| 2019/0391904 | A1* | 12/2019 | Sabharwal | G06N 3/08 |
| 2020/0065219 | A1* | 2/2020 | Bavishi | G06F 11/3608 |
| 2020/0293354 | A1* | 9/2020 | Song | G06F 8/71 |
| 2021/0141640 | A1* | 5/2021 | Turner | G06F 8/38 |

OTHER PUBLICATIONS

Chuan-Wen Chang et al., "A cross-site patch management model and architecture design for large scale heterogeneous environment," 2005 [retrieved on Nov. 1, 24], Proceedings 39th Annual 2005 International Carnahan Conference on Security Technology, pp. 1-6, <url>:https://ieeexplore.ieee.org. (Year: 2005).*

The Linux Foundation, "What is Kubernetes?" https://kubernetes.io/docs/concepts/overview/what-is-kubernetes/, Oct. 22, 2020, 4 pages.

VMware Inc. "Microservices," https://spring.io/microservices, Accessed Jan. 14, 2021, 4 pages.

VMware Inc. "VMware Tanzu," Solution Brief, Jan. 2021, 3 pages.

S. Sugob, "The Twelve-Factor App—A Successful Microservices Guideline," https://medium.com/hiredevops-org/the-twelve-factor-app-a-successful-microservices-guideline-497f45aac506, Feb. 28, 2019, 7 pages.

YAML.org, "YAML Ain't Markup Language," https://yaml.org, Accessed Jan. 14, 2021, 2 pages.

\* cited by examiner

| ERROR TYPE | CATEGORY | LANGUAGE | REMEDY | |
|---|---|---|---|---|
| | | | Prefix | |
| UNHANDLED | System.DivideByZeroException | C# | B: | Try{ |
| | | | E: | } catch(System.DivideByZeroException sde){<br>Console.WriteLine(sde.Message<br>} |

```
public class TestCodeGeneration
{
        public void DivideMe(int i, int j)
        {
                int firstNumber = i;
                int secondNumber = j;

int result = i / j;
                Console.WriteLine("Result is " + result);

```
Unhandled exception. System.DivideByZeroException: Attempted to divide by zero.
  at Adaptive_Microservice.TestCodeGeneration.DivideMe(Int32 i, Int32 j) in
C:\Users\user1\source\repos\Adaptive Microservice\Adaptive Microservice\Program.cs:line 23
  at Adaptive_Microservice.Program.Main(String[] args) in
C:\Users\user1\source\repos\Adaptive Microservice\Adaptive Microservice\Program.cs:line 11
```

```
public class TestCodeGeneration
{
        public void DivideMe(int i, int j)
        {
                int firstNumber = i;
                int secondNumber = j;
                try
                {
                        int result = i / j;

Console.WriteLine("Result is " + result);
                }
                catch (System.DivideByZeroException sde)
                {
                        Console.WriteLine("Log the exception " + sde.Message);
                }
        }
}
```

FIG. 6D

| ERROR TYPE | CATEGORY | LANGUAGE | REMEDY | |
|---|---|---|---|---|
| | | | Prefix | |
| SONARSCAN | RSPEC-5131 | C# | C:<lineNumber> | System.Web.Security.AntiXss.AntiXssEncoder.Html Encode(<object>, true); |

```
[ApiController]
[Route("[controller]")]
public class MyService : ControllerBase
{

[HttpGet]
    public Hello<String> Get()
    {
        string name = Request.QueryString["name"];
        string returnString = "Hello " + name; //Noncompliant
        return returnString;
    }
}
```

Endpoints should not be vulnerable to reflected cross-site scripting (XSS) attacks: RSPEC-5131. Line 9 Source: Service.cs

715

```
[ApiController]
[Route("[controller]")]
public class MyService : ControllerBase
{

[HttpGet]
    public Hello<String> Get()
    {
        string name = Request.QueryString["name"];

/* Detected Security Vulnerability
           Suggested Code:
             name = System.Web.Security.AntiXss.AntiXssEncoder.HtmlEncode(name, true);
        */ string returnString = "Hello " + name;
            return returnString;
    }
}
```

```
[ApiController]
[Route("[controller]")]
public class MyService : ControllerBase
{
   [HttpGet]
   public User<String> Get()
   {
      string name = Request.QueryString["name"];
      string returnString = "Hello " + name;
            return returnString;
   }
   public int DivideMe(int i, int j){
      return i/j;
   }
   public IActionResult Authenticate(string user)
      {
         string query = "SELECT * FROM Users WHERE Username = '" + user + "'";
         var userExists = false;
         if (_context.Database.ExecuteSqlCommand(query) > 0) // Noncompliant
         {
            userExists = true;
         }
         return Content(userExists ? "success" : "fail");
      }
}
```

```
[ApiController]
[Route("[controller]")]
public class MyService : ControllerBase
{
   [HttpGet]
   public User<String> Get()
   {
      string name = Request.QueryString["name"];
      /* Detected Security Vulnerability
         Suggested Code:
         name = System.Web.Security.AntiXss.AntiXssEncoder.HtmlEncode(name, true); .
      */
               string returnString = "Hello " + name; // Noncompliant
               return returnString;
   }
   public int DivideMe(int i, int j){
      /* Frequent Unhandled Exception
         Suggested remedy: handle exception
         Auto Updated
      */
      try{
         return i/j;
      }catch (System.ZeroDevideException sde){
         //log error
      }
   }
   public IActionResult Authenticate(string user)
      {
         string query = "SELECT * FROM Users WHERE Username = '" + user + "'";
         var userExists = false;
         /* Detected Security Vulnerability
         Suggested Code:
         var query = "SELECT * FROM Users WHERE Username = {0}";
         var userExists = false;
         if (_context.Database.ExecuteSqlCommand(query,user) > 0)
         {
            userExists = true;
         }
         */
         if (_context.Database.ExecuteSqlCommand(query) > 0) // Noncompliant
         {
            userExists = true;
         }
         return Content(userExists ? "success" : "fail");
      }
}
```

FIG. 8B

AUTOMATED GENERATION OF ADDITIONAL VERSIONS OF MICROSERVICES

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD

The field relates generally to information processing, and more particularly to microservices in information processing systems.

BACKGROUND

Information processing systems increasingly utilize reconfigurable virtual resources to meet changing user needs in an efficient, flexible and cost-effective manner. For example, cloud computing and storage systems implemented using virtual resources such as virtual machines have been widely adopted. Other virtual resources now coming into widespread use in information processing systems include Linux containers. Such containers may be used to provide at least a portion of the virtualization infrastructure of a given cloud-based information processing system. However, significant challenges can arise in the management of services in cloud-based information processing systems.

SUMMARY

Illustrative embodiments of the present disclosure provide techniques for automated generation of additional versions of microservices.

In one embodiment, an apparatus comprises at least one processing device comprising a processor coupled to a memory. The at least one processing device is configured to perform the steps of detecting one or more issues associated with execution of a first version of a microservice in one or more computing environments, determining whether any of the detected one or more issues correspond to one or more triggers of one or more predefined patterns in a knowledge base, and, responsive to determining that at least one of the detected one or more issues corresponds to at least one of the one or more triggers of at least one of the one or more predefined patterns in the knowledge base, utilizing one or more code modification data structures specified in the at least one of the one or more predefined patterns to modify source code of the microservice. The at least one processing device is further configured to perform the steps of generating at least one additional version of the microservice utilizing the modified source code, and deploying the at least one additional version of the microservice in at least one of the one or more computing environments.

These and other illustrative embodiments include, without limitation, methods, apparatus, networks, systems and processor-readable storage media.

BRIEF DESCRIPTION OF THE DRAWINGS

FIGS. 6A-6D show an example of microservice code regeneration through automatic modification of source code in an illustrative embodiment.

FIGS. 7A-7D show an example of microservice code regeneration through insertion of modification suggestion through commented source code in an illustrative embodiment.

FIGS. 8A and 8B show code of microservice before and after application of microservice code regeneration logic in an illustrative embodiment.

DETAILED DESCRIPTION

Figure 1:
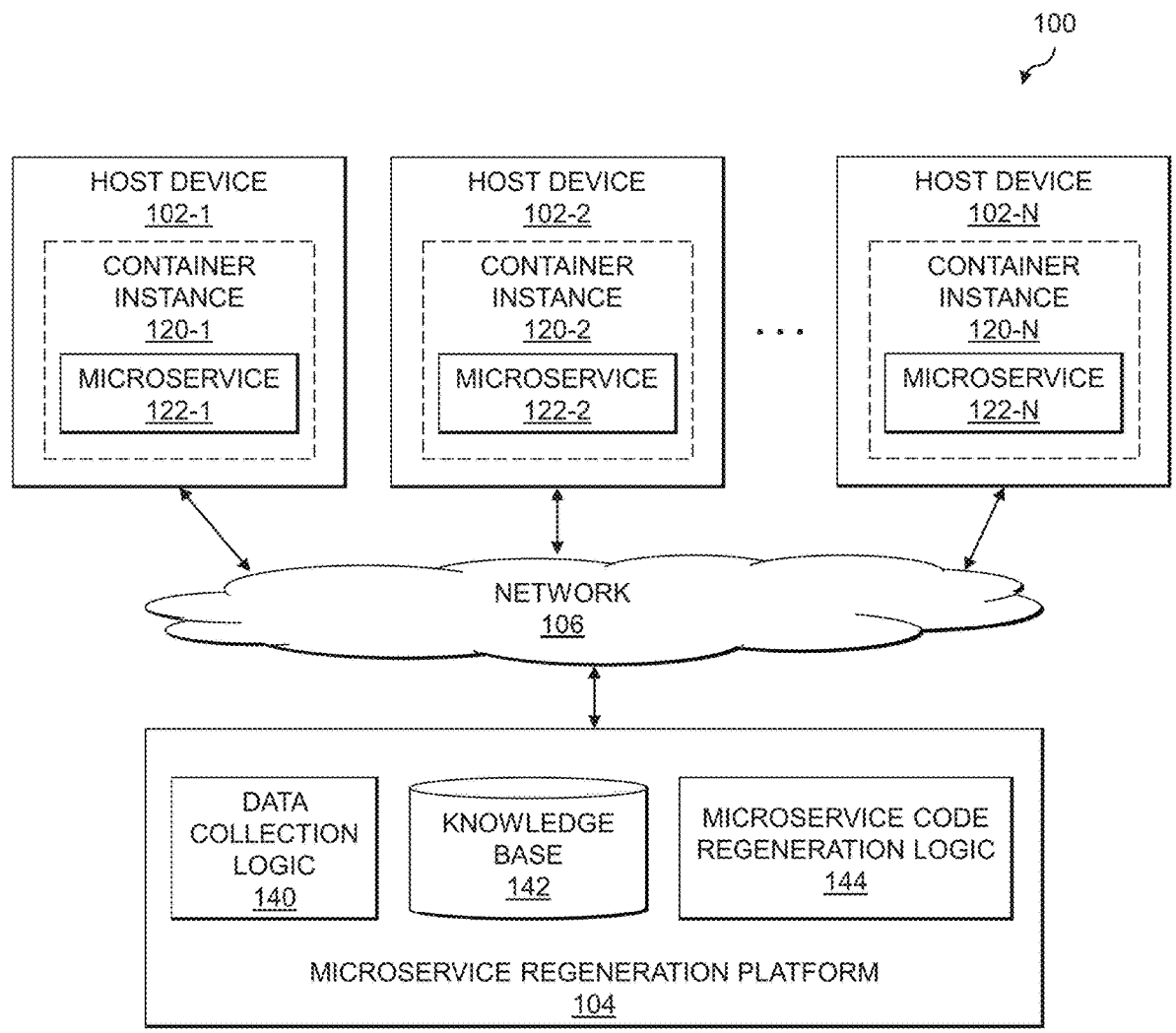
FIG. 1 is a block diagram of an information processing system configured for automated generation of additional versions of microservices in an illustrative embodiment.

Illustrative embodiments will be described herein with reference to exemplary information processing systems and associated computers, servers, storage devices and other processing devices. It is to be appreciated, however, that embodiments are not restricted to use with the particular illustrative system and device configurations shown. Accordingly, the term "information processing system" as used herein is intended to be broadly construed, so as to encompass, for example, processing systems comprising cloud computing and storage systems, as well as other types of processing systems comprising various combinations of physical and virtual processing resources. An information processing system may therefore comprise, for example, at least one data center or other type of cloud-based system that includes one or more clouds hosting tenants that access cloud resources.

Software architecture may be designed in various ways. In some architectures, software may provide a number of functions in the form of a single, monolithic application. A "monolithic" application refers to a single-tiered, tightly-coupled software application in which various elements of the software architecture (e.g., a user interface, database access, processing logic, etc.) are combined into a single program, usually on a single platform. In software engineering, a monolithic application describes a software application that is designed without modularity. In general, modularity of software elements in a software architecture is desirable, as modularity supports reuse of portions of application logic while also enabling efficient maintenance and development (e.g., by enabling repair and replacement of parts of an application without requiring upgrading the entire application).

Monolithic applications may suffer from disadvantages relating to innovation, manageability, resiliency and scalability, particularly in computing environments such as cloud computing environments, datacenters, and converged infrastructure. As an alternative to such monolithic applications, some software architectures provide different functions in the form of microservices. In a microservice architecture, a single application is developed as a suite of small microservices. A microservice can run on its own process and communicate with other systems or services through a lightweight mechanism, such as a hypertext transport protocol (HTTP) resource application programming interface (API) or communication API provided by an external system. Microservices in some embodiments are assumed to be independently deployable using fully automated deployment mechanisms.

In some embodiments, microservices are small, independent and composable services that can be accessed through Representational State Transfer (RESTful) APIs. Thus, a single monolithic application may be broken down into separate and independent microservices for discrete functions, providing potential benefits in innovation, manageability, resiliency and scalability. Innovation benefits may be provided through the ability to develop and deploy new versions of microservices more rapidly as compared to a single monolithic application. Manageability benefits may be realized as the code used is smaller and thus easier to understand, facilitating changes and deployments. Resiliency benefits may be realized as functionality may be distributed across multiple microservices, such that failure or downtime of one microservice does not result in loss of functionality provided by other microservices. Scalability benefits may be realized in that microservices can be deployed and scaled independently of one another.

Microservices-based software architectural design structures an application as a collection of loosely coupled services. Microservices-based software architectures may be viewed as a variant of a service-oriented architecture that focuses on fine-grained services, lightweight protocols, etc. A microservices architecture enables individual microservices to be deployed and scaled independently, such as via software containers. Individual microservices can be worked on in parallel by different teams, may be built in different programming languages, and have continuous delivery and deployment flows. As development moves toward cloud-native approaches, it is desired to decompose, disintegrate or otherwise separate existing monolithic applications into microservices. Advantageously, microservices allow software developers of an enterprise to work independently and communicate together. Thus, an enterprise system can achieve better efficiency and resiliency with microservices as compared with monolithic applications, while providing similar or better results.

FIG. 1 shows an information processing system 100 configured in accordance with an illustrative embodiment for automated generation of additional versions of microservices. The information processing system 100 comprises one or more host devices 102-1, 102-2, . . . 102-N (collectively, host devices 102) and a microservice regeneration platform 104 that communicate over a network 106.

The host devices 102 and the microservice regeneration platform 104 illustratively comprise respective computers, servers or other types of processing devices capable of communicating with one another via the network 106. For example, at least a subset of the host devices 102 and the microservice regeneration platform 104 may be implemented as respective virtual machines of a compute services platform or other type of processing platform. The host devices 102 and the microservice regeneration platform 104 in such an arrangement illustratively provide compute services such as execution of one or more applications on behalf of each of one or more users associated with respective ones of the host devices 102 and the microservice regeneration platform 104.

The term "user" herein is intended to be broadly construed so as to encompass numerous arrangements of human, hardware, software or firmware entities, as well as combinations of such entities.

Compute and/or storage services may be provided for users under a Platform-as-a-Service (PaaS) model, an Infrastructure-as-a-Service (IaaS) model and/or a Function-as-a-Service (FaaS) model, although it is to be appreciated that numerous other cloud infrastructure arrangements could be used. Also, illustrative embodiments can be implemented outside of the cloud infrastructure context, as in the case of a stand-alone computing and storage system implemented within a given enterprise.

In the information processing system 100 of FIG. 1, the host devices 102-1, 102-2, . . . 102-N are assumed to run respective software container instances 120-1, 120-2, . . . 120-N (collectively, software container instances 120) in which respective microservices 122-1, 122-2, . . . 122-N (collectively, microservices 122) execute. It should be appreciated that the software container instances 120 (also referred to herein as container instances 120 or containers 120) may be optional, and that the microservices 122 may run or execute directly on the host devices 102, or otherwise outside of the container instances 120 running on the host devices 102.

While FIG. 1 shows an example wherein each of the host devices 102 runs a single container instance, embodiments are not limited to this arrangement. Instead, each of the host devices 102 may run multiple container instances, including embodiments wherein all of the container instances (e.g., 120) run on the same host device (e.g., one of the host devices 102). In addition, while each of the container instances 120 is shown in FIG. 1 as running or executing just a single one of the microservices 122, one or more of the container instances 120 may run multiple microservices. This includes arrangements where a single one of the container instances 120 runs multiple different microservices 122, etc. Further, as noted above, the microservices 122 may run or execute directly on or otherwise outside of the container instances 120 on any combination of the host devices 102.

The microservice regeneration platform 104 implements functionality for upgrading different ones of the microservices 122 to subsequent versions, where such subsequent versions provide fixes for issues or other errors encountered during execution of the microservices 122 on the host devices 102. The microservice regeneration platform 104 implements data collection logic 140, knowledge base 142 and microservice code regeneration logic 144. The data collection logic 140 is configured to collect information regarding issues and errors encountered during execution of the microservices 122 (e.g., information regarding unhandled exceptions, memory heap issues, events, security vulnerabilities, etc.). Such information is used to populate the knowledge base 142 with a set of patterns for how to "evolve" or adjust code of the microservices 122 between different versions to remedy the issues and errors encountered. Each pattern may include one or more trigger points (e.g., one or more issues and errors) and associated code modification or other remediation rules (e.g., automated changes to the code, suggestions inserted as comments in the code, etc.).

The microservice code regeneration logic 144 is configured to generate new versions of the microservices 122 using such patterns in the knowledge base 142. This may include evolving the same microservice to different subsequent versions based on different types of issues and errors encountered during execution of instances of that microservice in different environments. For example, microservice 122-1 and microservice 122-2 may be a same microservice which is executed in different environments (e.g., the container instances 120-1 and 120-2 on host devices 102-1 and 102-2). Different issues may be encountered while executing the microservice 122-1 on the container instance 120-1 of the host device 102-1 than are encountered while executing the microservice 122-1 on the container instance 120-2 of the host device 102-2. The data collection logic 140 may collect such different issues encountered by the microservices 122-1 and 122-2, and then the microservice code regeneration logic 144 can make different suggestions for evolving to different subsequent versions of the microservice for execution in the different environments (e.g., container instance 120-1 on host device 102-1, container instance 120-2 on host device 102-2).

At least portions of the functionality of the data collection logic 140, knowledge base 142 and microservice code regeneration logic 144 may be implemented at least in part in the form of software that is stored in memory and executed by a processor.

The host devices 102 and the microservice regeneration platform 104 in the FIG. 1 embodiment are assumed to be implemented using at least one processing platform, with each processing platform comprising one or more processing devices each having a processor coupled to a memory. Such processing devices can illustratively include particular arrangements of compute, storage and network resources. For example, processing devices in some embodiments are implemented at least in part utilizing virtual resources such as virtual machines (VMs) or Linux containers (LXCs), or combinations of both as in an arrangement in which Docker containers or other types of LXCs are configured to run on VMs.

The host devices 102 and the microservice regeneration platform 104 (or one or more components thereof such as the container instances 120, microservices 122, data collection logic 140, knowledge base 142, microservice code regeneration logic 144) may be implemented on respective distinct processing platforms, although numerous other arrangements are possible. For example, in some embodiments at least portions of one or more of the host devices 102 and the microservice regeneration platform 104 are implemented on the same processing platform. The microservice regeneration platform 104 can therefore be implemented at least in part within at least one processing platform that implements at least a subset of the host devices 102.

The network 106 may be implemented using multiple networks of different types. For example, the network 106 may comprise a portion of a global computer network such as the Internet, although other types of networks can be part of the network 106 including a wide area network (WAN), a local area network (LAN), a satellite network, a telephone or cable network, a cellular network, a wireless network such as a WiFi or WiMAX network, a storage area network (SAN), or various portions or combinations of these and other types of networks. The network 106 in some embodiments therefore comprises combinations of multiple different types of networks each comprising processing devices configured to communicate using Internet Protocol (IP) or other related communication protocols.

The host devices 102 and the microservice regeneration platform 104 in some embodiments may be implemented as part of a cloud-based system. The host devices 102 and the microservice regeneration platform 104 can be part of what is more generally referred to herein as a processing platform comprising one or more processing devices each comprising a processor coupled to a memory. A given such processing device may correspond to one or more virtual machines or other types of virtualization infrastructure such as Docker containers or other types of LXCs. As indicated above, communications between such elements of system 100 may take place over one or more networks including network 106.

The term "processing platform" as used herein is intended to be broadly construed so as to encompass, by way of illustration and without limitation, multiple sets of processing devices and one or more associated storage systems that are configured to communicate over one or more networks. For example, distributed implementations of the host devices 102 and the microservice regeneration platform 104 are possible, in which certain ones of the host devices 102 reside in one data center in a first geographic location while other ones of the host devices 102 reside in one or more other data centers in at least a second geographic location that is potentially remote from the first geographic location. The microservice regeneration platform 104 may be implemented at least in part in the first geographic location, the second geographic location, and one or more other geographic locations. Thus, it is possible in some implementations of the system 100 for different ones of the host devices 102 and the microservice regeneration platform 104 to reside in different data centers.

Numerous other distributed implementations of the host devices 102 and the microservice regeneration platform 104 are possible. Accordingly, the host devices 102 and the microservice regeneration platform 104 can also be implemented in a distributed manner across multiple data centers.

Additional examples of processing platforms utilized to implement portions of the system 100 in illustrative embodiments will be described in more detail below in conjunction with FIGS. 9 and 10.

It is to be understood that the particular set of elements shown in FIG. 1 for automated generation of additional versions of microservices is presented by way of illustrative example only, and in other embodiments additional or alternative elements may be used. Thus, another embodiment may include additional or alternative systems, devices and other network entities, as well as different arrangements of modules and other components.

It is to be appreciated that these and other features of illustrative embodiments are presented by way of example only, and should not be construed as limiting in any way.

Figure 2:
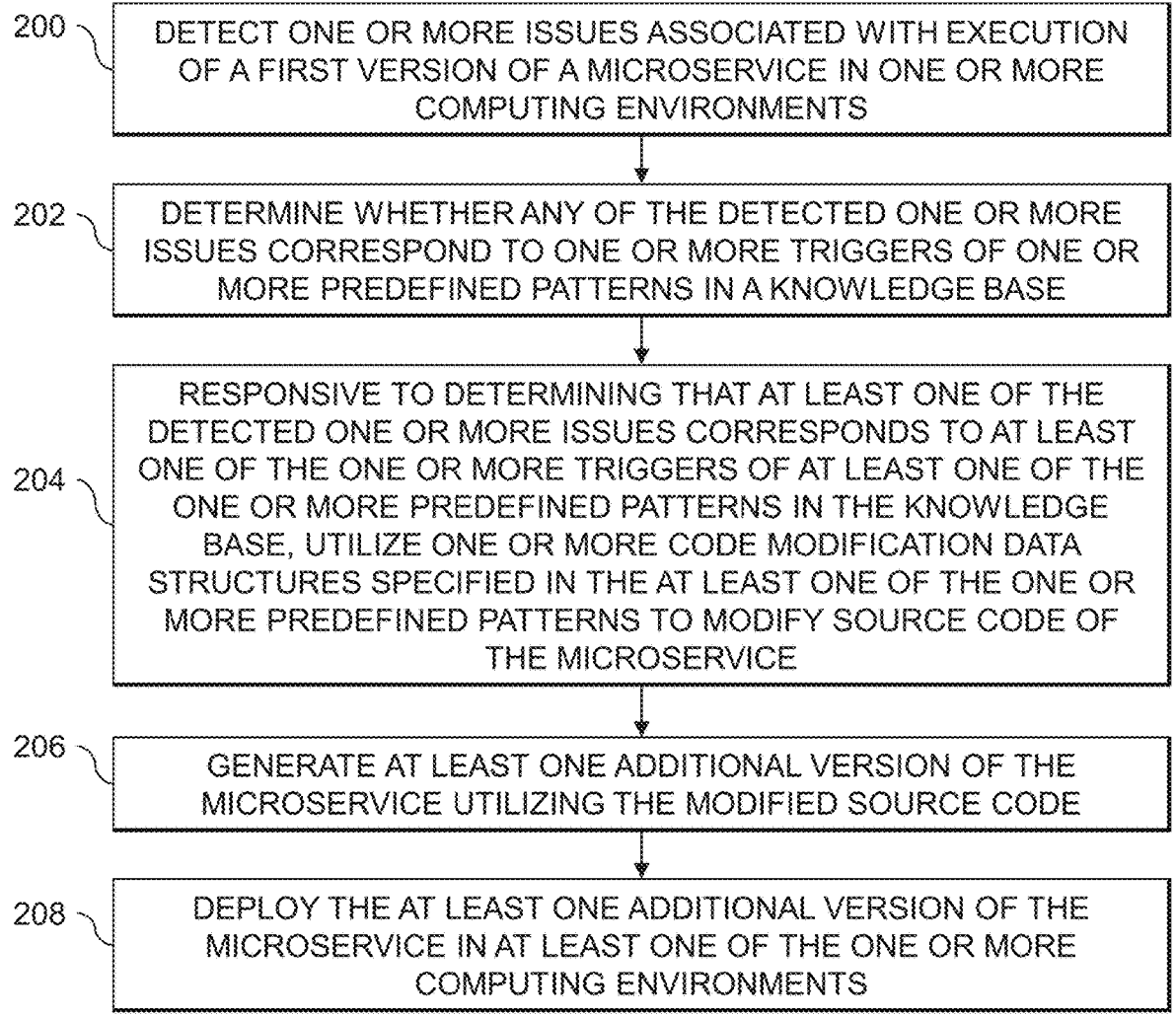
FIG. 2 is a flow diagram of an exemplary process for automated generation of additional versions of microservices in an illustrative embodiment.

An exemplary process for automated generation of additional versions of microservices will now be described in more detail with reference to the flow diagram of FIG. 2. It is to be understood that this particular process is only an example, and that additional or alternative processes for automated generation of additional versions of microservices may be used in other embodiments.

In this embodiment, the process includes steps 200 through 208. These steps are assumed to be performed by the microservice regeneration platform 104 utilizing the data collection logic 140, the knowledge base 142 and the microservice code regeneration logic 144. The process begins with step 200, detecting one or more issues associated with execution of a first version of a microservice (e.g., microservice 122-1) in one or more computing environments. Step 200 may include parsing one or more logs generated by the first version of the microservice, parsing a memory heap of a memory in the one or more computing environments in which the first version of the microservice executes, parsing an event viewer comprising events generated by the first version of the microservice, and parsing one or more security vulnerability scan results.

In step 202, a determination is made as to whether any of the detected one or more issues correspond to one or more triggers of one or more predefined patterns in a knowledge base (e.g., knowledge base 142). Each of the one or more predefined patterns in the knowledge base may comprise an indication of a source code programming language utilized by the first version of the microservice, an issue type, a specific issue, and an issue log.

Responsive to determining that at least one of the detected one or more issues corresponds to at least one of the one or more triggers of at least one of the one or more predefined patterns in the knowledge base, one or more remedies (e.g., code modification data structures) specified in the at least one of the one or more predefined patterns is utilized to modify source code of the microservice in step 204. The one or more remedies specified in the at least one of the one or more predefined patterns may comprise a set of rules for utilizing code snippets to modify the source code of the microservice. Each of the set of rules for utilizing the code snippets to modify the source code of the microservice may specify at least one of: a location where at least one of the code snippets is to be inserted in the source code; a portion of existing source code that is to be replaced with at least one of the code snippets; and a location where comments are to be inserted in the source code, the comments comprising suggestions for at least one of inserting at least one of the code snippets and replacing a portion of existing source code with at least one of the code snippets.

At least one additional version of the microservice is generated in step 206 utilizing the modified source code. In some embodiments, step 206 includes adding the one or more remedies in the source code. In other embodiments, step 206 includes adding the one or more remedies as suggestions via comments in the source code. The at least one additional version of the microservice is deployed in step 208 in at least one of the one or more computing environments.

In some embodiments, step 200 includes detecting a first set of one or more issues associated with execution of the first version of the microservice in a first one of the one or more computing environments and detecting a second set of one or more issues associated with execution of the first version of the microservice in a second one of the one or more computing environments. The first one of the one or more computing environments may comprise a test environment, and the second one of the one or more computing environments may comprise a production environment. The first one of the one or more computing environments may comprise a first container instance running on a first container host device having a first set of compute, storage, memory and network resources, and the second one of the one or more computing environments may comprise a second container instance running on a second container host device having a second set of compute, storage, memory and network resources different than the first set of compute, storage, memory and network resources.

Step 206 may include generating first modified source code of the microservice based at least in part on a first set of the one or more predefined patterns in the knowledge base having a first set of triggers that correspond to the first set of one or more issues associated with execution of the first version of the microservice in the first one of the one or more computing environments, and generating second modified source code of the microservice based at least in part on a second set of the one or more predefined patterns in the knowledge base having a second set of triggers that correspond to the second set of one or more issues associated with execution of the second version of the microservice in the second one of the one or more computing environments. Step 206 may further include at least one of generating the at least one additional version of the microservice utilizing the modified source code, generating a second version of the microservice utilizing the first modified source code and generating a third version of the microservice utilizing the second modified source code. Step 208 may include deploying the at least one additional version of the microservice in the at least one of the one or more computing environments, deploying the second version of the microservice in the first one of the one or more computing environments and deploying the third version of the microservice in the second one of the one or more computing environments. Step 208 may further include at least one of: deploying the second version of the microservice in at least a third one of the one or more computing environments sharing one or more common characteristics with the first one of the one or more computing environments; and deploying the third version of the microservice in at least a fourth one of the one or more computing environments sharing one or more common characteristics with the second one of the one or more computing environments. The one or more common characteristics comprise at least a threshold similarity in an available amount of compute, storage, memory and network resources, whether the computing environments are test or production environments, etc.

As described above, the concept of microservices is based on service-oriented software development wherein a software application program (application) is created as a set of loosely-coupled services. Microservices are growing in usage, especially with container-based approaches such as, by way of example only, Kubernetes® and VMware Tanzu®, etc. Microservices versioning may be performed after updating features and fixing code issues. Sometimes, the next version of a microservice fixes code issues or fixes vulnerabilities. Microservices versioning, however, is a highly manual process.

Illustrative embodiments provide techniques for automatically producing or giving suggestions for the next "evolution" or version of a microservice (e.g., adaptation by the microservice itself). To do so, some embodiments address issues with a current version of a microservice (e.g., code issues, not additional features) by learning from various sources. Such sources include, but are not limited to: logs; unhandled exceptions; CPU and memory allocations at high, medium and low load conditions; dynamic security or vulnerability scan results; etc. In some cases, the same microservice may evolve in a next generation in different ways depending on the types of environments (e.g., a production environment, a testing environment, etc.) in which the microservice runs. In a testing environment with a lot of negative test cases, next generation suggestions for the microservice may be based mainly on unhandled error conditions. In a production environment, the next generation suggestions may be based mainly on memory issues and dynamic security or vulnerability scan results. In some embodiments, microservices versioning is modeled on evolution of species, which can adapt to environment changes, the attacks or threats of bacteria and viruses, etc.

Microservices may run under different conditions (e.g., in the same or different environments in which a particular microservice is deployed). Such different conditions may include, but are not limited to: low, medium and high traffic conditions; varying amounts of CPU and memory allocations; varying amounts of unhandled error conditions or other exceptions; varying amounts and types of security vulnerabilities; etc. In some cases, microservice code will handle some of such varying conditions gracefully, though typically some of such conditions may not have been addressed, resulting in high response time, unhandled exceptions, various errors (e.g., 400 "bad request" or 500 "internal server error" responses) and cyber-attacks, etc. A particular microservice may also fail to execute at one point in time due to some of the above conditions, but when that microservice is re-executed or re-tried it may execute as expected (e.g., with a 200 "OK" or "success" response). Some embodiments may utilize a "circuit breaker" design pattern, meaning that most of the issues have pre-defined solutions.

In a conventional approach, if there is a total failure of a microservice, a human analyst will need to manually review logs and/or code of the microservice to find out the issue, apply a fix, and deploy it in production. For example, code review may indicate that after continuous or total failure the issue is a lack of proper exception handling and/or allowing memory leaks. Each different type of issue demands a lot of skill and experience to find the appropriate solution. Illustrative embodiments provide approaches that enable microservices to intelligently adapt to the environments in which they will run (e.g., some set of CPU, memory, traffic and input parameters), and that enable microservices to evolve in a way that addresses issues automatically wherever possible. In some embodiments, intuitive suggestions are generated for creating the next version of the microservice for a given environment. A developer can look at such suggestions and adopt them if desired to at least partially automate generation of the next version of the microservice for the given environment.

Microservice behavior is typically static. If there are any issues with the implementation of a microservice such that the microservice is not able to respond in the way needed or desired, a human analyst will need to analyze the issues (e.g., memory issues, CPU usage issues, security vulnerabilities, wrong usage of the code, etc.), update the code of the microservice, and then re-deploy the microservice. Consider, as an example, code review of a microservice that is experiencing memory issues (e.g., high memory usage, not responding or responding with 500 "internal server error" responses, etc.). In response, a human analyst may decide to check the way that exception handling is done in the microservice. Most of the time, the microservice will not handle the exception such that the system on which it runs (e.g., a container) will handle the exception and keep an object in heap memory because it will not be able to garbage collect. Thus, memory usage of the microservice increases continuously and starts to give errors (e.g., 500 "internal server error" responses). To resolve such an issue, the human analyst will need to do manual code review and give suggestions for a developer to change the code of the microservice to add proper exception handling and then re-deploy the microservice with the updated code.

The above-described manual approach, however, is difficult and time-consuming, requiring a human analyst with a high level of skill and knowledge. This may be exacerbated by the fact that there may be many different reasons that a microservice may respond with a particular error type. For example, there may be a multitude of reasons that a microservice sends a 500 "internal server error" response in high traffic situations, including but not limited to: unhandled exceptions; multiple initialization of a class that leads to "out of memory" exceptions; not using a factory pattern for an object initialization (e.g., "connection") that leads to high memory consumption; wrong usage of logging; etc. In addition, there can be security vulnerabilities in the code of the microservice. Once a security or vulnerability scan is run, issues may be suggested (possibly along with remedies for such issues). In existing approaches, the only way to resolve the above is to have a human analyst manually analyze logs and conduct a proper code review to identify any issues, update the code of the microservice, and re-deploy the microservice. Such an approach demands a lot of skill and experience just to properly identify issues and their root cause. Further, the fixes for such issues also demand a lot of skill and experience in the coding language which is utilized and the environments in which the microservices are created and deployed. The quality of the fixes (if the human analyst is even able to properly identify issues) is dependent on the skill set of the human analyst.

Illustrative embodiments provide approaches that enable a microservice itself to "evolve" to its next generation automatically, by learning the issues that are getting logged by the microservice and the reasons for such errors in the environments in which the microservice is deployed. Generation of code for the next version of the microservice may be achieved in multiple ways. If the recurring errors encountered by the microservice fall within a set of regeneration rules, then new code may be generated automatically to create the next generation of code that addresses the issues encountered by the microservice in one or more of the environments in which the microservice is deployed (as described in further detail elsewhere herein, the same current version of a microservice may "evolve" to different subsequent versions for use in different types of environments). If the recurring errors encountered by the microservice do not fall within the set of regeneration rules, intuitive suggestions may be generated for adapting the source code of the microservice. In some embodiments, such suggestions may be dynamically inserted into the code of the microservice, allowing a developer to accept or reject the suggestions for the next generation code used in subsequent versions of the microservice.

In some embodiments, patterns are defined for fixing specific types of problems or issues. For example, unhandled exception issues may often be fixed using a try-catch block, null pointer exception issues may often be fixed by checking the object as null, etc. Thus, a rule engine is created in some embodiments which defines patterns for fixing specific types of problems or issues encountered while running microservices. The rule engine can analyze logs produced by microservices and identify problems or issues that match one or more of the defined patterns or rules specified in the rule engine. When a match is found, the fix specified in the matching rule may be applied to update the code of the microservice based on the detected problems or issues (e.g., error conditions). If there is no remedy specified in the matching rule for automatically generating the code, an intuitive description and code snippet may be provided to a developer to remedy the issues in a next generation of the microservice. Thus, the next evolution of the microservice includes contextual-driven changes to the code of the microservice that are based on the type of environment in which the microservice runs (e.g., to address the types of issues that are being faced in that environment type). This is similar to the process of creating antibodies to fight viruses, or evolution of species to adapt to an environment.

Figure 3:
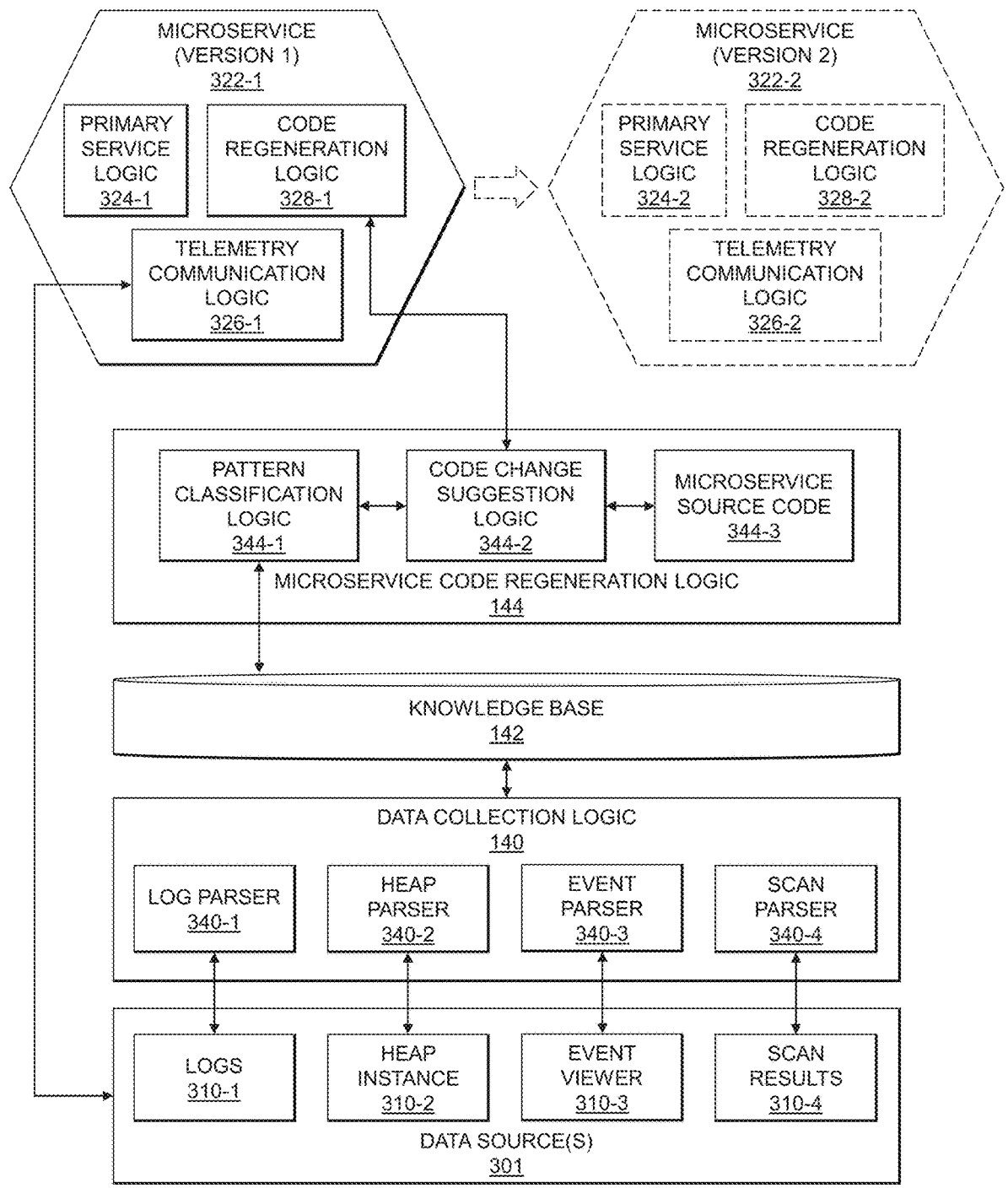
FIG. 3 shows an architecture for microservice code regeneration utilizing the microservice regeneration platform of FIG. 1 in an illustrative embodiment.

In some embodiments, the functionality for evolving or dynamically adapting microservices is provided as part of what is referred to as a microservice regeneration platform (e.g., the microservice regeneration platform 104). FIG. 3 shows an architecture for evolving a first version of a microservice 322-1 to a second version of the microservice 322-2 utilizing the microservice regeneration platform 104. The first and second versions of the microservice 322-1 and 322-2 are collectively referred to as microservice 322. The microservice 322-1 includes primary service logic 324-1, telemetry communication logic 326-1, and code regeneration logic 328-1. The microservice 322-2 similarly includes primary service logic 324-2, telemetry communication logic 326-2, and code regeneration logic 328-2. The primary service logic 324-1 and 324-2 (collectively, primary service logic 324) are configured to perform primary tasks of the microservices 322-1 and 322-2. The telemetry communication logic 326-1 and 326-2 (collectively, telemetry communication logic 326) are configured to perform logging (e.g., of errors and other issues encountered during operation of the primary tasks of the microservices 322 by the primary service logic 324). The code regeneration logic 328-1 and 328-2 (collectively, code regeneration logic 328) are configured to receive code change suggestions from microservice code regeneration logic 144 of the microservice regeneration platform 104 for evolving to subsequent versions. For example, the code regeneration logic 328-1 of the first version of the microservice 322-1 can utilize such suggestions to generate the second version of the microservice 322-2. To do so, the code regeneration logic 328-1 may modify code of the primary service logic 324-1 to the primary service logic 324-2, such that at least one of the one or more issues or errors encountered by the first version of the microservice 322-1 will not be encountered by the second version of the microservice 322-2.

The microservice regeneration platform 104, as discussed above, includes data collection logic 140, knowledge base 142, and microservice code regeneration logic 144. The data collection logic 140 is configured to analyze a set of data sources 301 to identify patterns of errors and issues encountered during execution of the primary service logic 324-1 of the first version of the microservice 322-1. The data sources 301 may include, for example, logs 310-1, heap instance 310-2, event viewer 310-3 and scan results 310-4. The telemetry communication logic 326-1 may provide logs generated during execution of the primary service logic 324-1 as the logs 310-1. The logs 310-1 may also or alternatively be generated by a container or other computing asset on which the microservice 322-1 runs (or another computing asset running in the same environment as the computing asset on which the microservice 322-1 runs). The heap instance 310-2 may include information from a memory heap of the microservice 322-1 (or a container or other computing asset on which the microservice 322-1 runs). The event viewer 310-3 monitors events generated during execution of the primary service logic 324-1 of the microservice 322-1. The scan results 310-4 may include results of security or vulnerability scans that are performed for the microservice 322-1 (e.g., for the primary service logic 324-1 thereof).

The data collection logic 140 implements a set of parsers, including log parser 340-1, heap parser 340-2, event parser 340-3 and scan parser 340-4 (collectively, parsers 340) that parse the logs 310-1, heap instance 310-2, event viewer 310-3 and scan results 310-4 to identify patterns of events or other issues encountered during execution of the primary service logic 324-1 of the microservice 322-1. Such pattern information is provided to knowledge base 142. Such pattern information is utilized by the microservice code regeneration logic 144 to generate the suggestions for modifying the code of the primary service logic 324-1 of the first version of the microservice 322-1 to evolve to the primary service logic 324-1 of the second version of the microservice 322-2. To do so, the microservice code regeneration logic 144 implements pattern classification logic 344-1 and code change suggestion logic 344-2. The code change suggestion logic 344-2 obtains at least a portion of the microservice source code 344-3 of the microservice 322-1 (e.g., at least the source code for the primary service logic 324-1) and, based on patterns classified by the pattern classification logic 344-1, will either automatically modify the source code of the microservice 322-1 or generate suggestions for modifying the source code of the microservice 322-1 (e.g., where such suggestions may be inserted as comments in the source code, enabling a developer to easily adopt such suggestions).

The microservice code regeneration logic 144 has knowledge of a path to the microservice source code 344-3 of deployed classes (e.g., of the primary service logic 324-1 of the first version of the microservice 322-1) in a secured location. The telemetry communication logic 326-1 and/or code regeneration logic 328-1 may also have access to the microservice source code 344-3. The telemetry communication logic 326-1 logs inputs and outputs, response time, errors, issues, security of vulnerability scan results, etc., and provides such information as data sources 301. The code regeneration logic 328-1 is configured to generate the next version of the code (e.g., of the primary service logic 324-1) used in the second version of the microservice 322-2 (e.g., the primary service logic 324-2).

The data collection logic 140, in some embodiments, is fed with various triggers and whenever those triggers are detected, various data points/factors associated with execution of the first version microservice 322-1 in a particular environment (e.g., the container that runs the first version microservice 322-1, a container host device which runs the container, a data center in which the container host device runs, etc.). Such various data points/factors may include: "side car" collections from the telemetry communication logic 326-1 provided as logs 310-1, including response time information, IO information, business logs, etc.; a heap histogram from heap instance 310-2 for the instances of the classes so as to determine which are in the heap for a long time (e.g., above some designated threshold duration) without garbage collection; a number of instantiations of the same class in the heap from heap instance 310-2; unhandled exceptions from an event viewer 310-3 query for one or more classes; dynamic security or vulnerability scan results 310-4. Various machine learning models may be used to analyze the collected data. Such machine learning models may implement classifiers, code module deciders, etc. The parsers 340 can parse the collected data to create the knowledge base 142, where such parsing may utilize the machine learning models.

The knowledge base 142 provides a knowledge data lake, and may store all the information from the triggers (e.g., which initiate data collection), rules (e.g., for adapting source code), access of environment data, etc. Information stored in the knowledge base 142 may include, but is not limited to information associated with: unhandled exceptions; unnecessary class initiation; long staying class instances in heap; logging defects; hardcoding removal; Structured Query Language (SQL) injection attacks; cross site scripting (XSS) attacks; dynamic security or vulnerability scan results; etc. The microservice code regeneration logic 144 utilizes pattern classification logic 344-1, code change suggestion logic 344-2 and microservice source code 344-3 to automatically modify code of the first version microservice 322-1, or to generate suggestions for modification of the code of the first version microservice 322-1.

Figure 4:
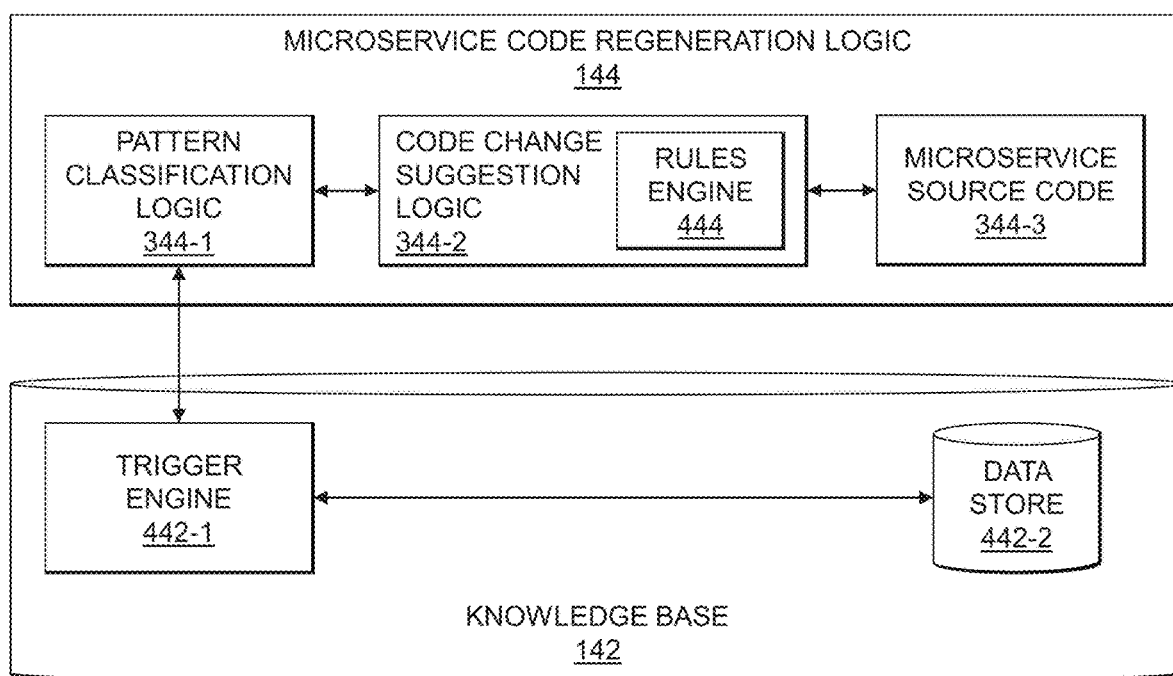
FIG. 4 shows a detailed view of the knowledge base and microservice code regeneration logic in an illustrative embodiment.

FIG. 4 shows a detailed view of portions of the knowledge base 142 and the microservice code regeneration logic 144. As shown in FIG. 4, the knowledge base 142 includes a trigger engine 442-1 and a data store 442-2, and the code change suggestion logic 344-2 implements a rules engine 444. The rules engine 444 is mapped to triggers defined by the trigger engine 442-1. Various types of triggers and rules may be defined, depending on the implementation. Some examples of trigger points (TP) and associated rules (R) are:

TP1: an unhandled exception occurs and it gradually raises memory usage→R1: put a try/catch block in the code, destroy the instance in the catch block and write to a log;

TP2: more than a threshold number of instances of the same class initialize and do not release memory→R2: add factory class for the same class;

TP3: logging is taking more than a threshold amount of time and/or response time increases above a threshold→R3: suppress one or more designated types of logs, such as information (INFO) and warning (WARN) logs;

TP4: logging is constructing the string for INFO level also→R4: use the parameterized parameter rather than using '+' for concatenation;

TP5: if hardcoding→R5: remove to add in configuration;

TP6: if exposed to SQL injection→R6: fix exposure;

TP7: if exposed to fixable XSS→R7: fix exposure;

TP8: security scan results include code snippet remedies (e.g., code modification data structures) for one or more found vulnerabilities→R8: fix the one or more found vulnerabilities using the code snippets given as the remedies.

It should be appreciated that the above examples of trigger points and associated rules are presented by way of example only, and that various other types of trigger points and associated rules may be used in other embodiments. Further, trigger points and rules may be added, removed and modified dynamically (e.g., by authorized users, such as designated subject matter experts (SMEs)) over time.

As shown in FIG. 4, the knowledge base 142 may comprise a trigger engine 442-1 and a data store 442-2. Information from the parsers 340 of the data collection logic 140 is converted into structured data and stored in the data store 442-2. The trigger engine 442-1 is configured with knowledge (e.g., trigger points) which when detected will call the intelligent suggestion maker (e.g., the pattern classification logic 344-1 and code change suggestion logic 344-2 of the microservice code regeneration logic 144). The knowledge base 142, in some embodiments, is pre-built or loaded with some set of known issues, triggers and remedies. Over time, the knowledge base 142 may be updated (e.g., on detecting new errors and issues, additional trigger points and associated remedies may be defined). The knowledge base 142 may first be pre-loaded with a set of known issues, triggers and remedies (e.g., for one or more specific coding languages and associated implementations). The knowledge base 142 may be continuously updated as different application error conditions by different applications (e.g., running on different microservices) are detected. Further, SMEs from all over an organization (and potentially outside of the organization) may further supplement the knowledge base 142. In some embodiments, each error condition or issue is parsed by one or more of the parsers 340, and is logged or entered as a data record in the data store 442-2, with the data record indicating: the coding language; the type of error or issue; the specific error or issue; and the error or issue log. Such data records may be made visible to SMEs in those areas, where the SMEs can see the code and add an associated remedy. In this way, each data record may include one or more trigger points and associated remediation rules (e.g., such as TP1→R1 through TP8→R8 described above).

Figure 5:
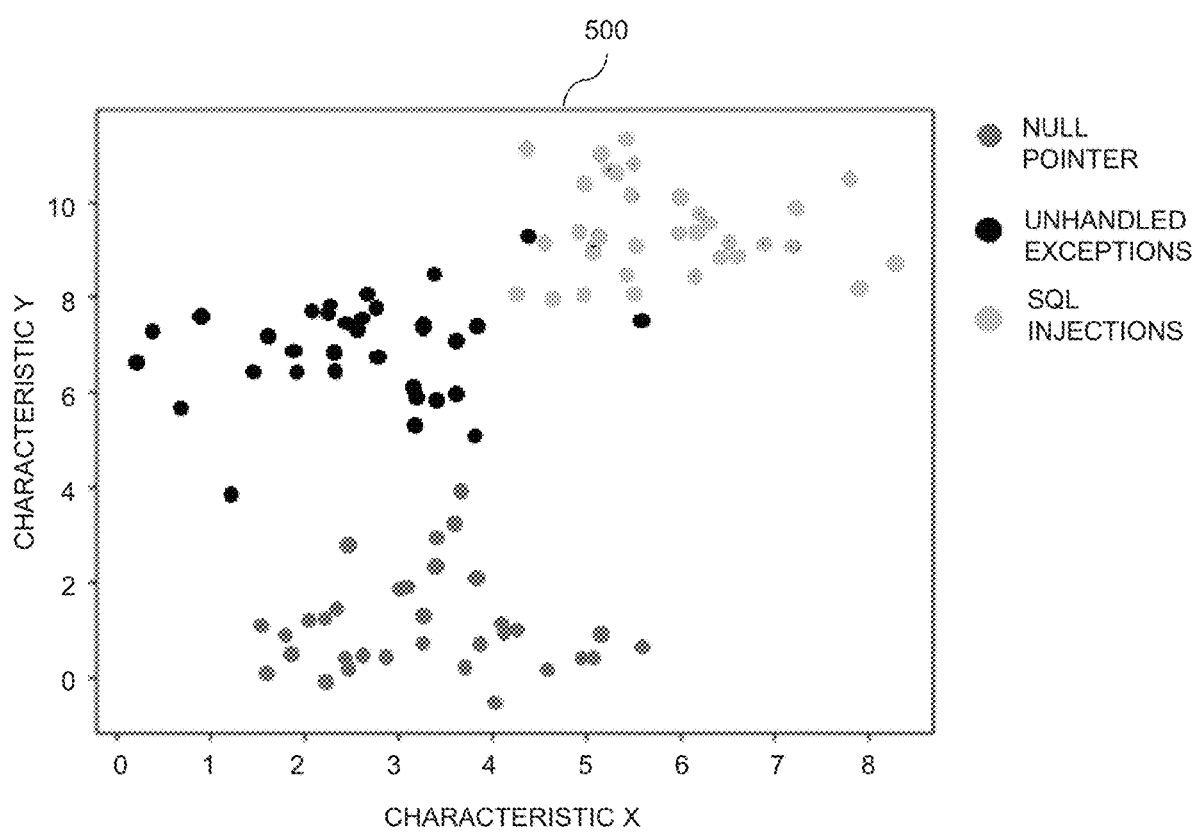
FIG. 5 shows a plot of clusters of different types of issues encountered during execution of microservices in an illustrative embodiment.

Functionality of the microservice code regeneration logic 144 will now be described in further detail. As shown in FIGS. 3 and 4, the microservice code regeneration logic 144 may comprise pattern classification logic 344-1, code change suggestion logic 344-2 implementing rules engine 444, and microservice source code 344-3. The pattern classification logic 344-1 is the stage which classifies reported issues by tapping into triggers (e.g., from trigger engine 442-1), where such triggers are generated and have associated predefined issues or errors and solutions. Various machine learning classification models may be used to classify the upcoming problem by tapping into different data from the knowledge base 142. FIG. 5 shows a plot 500 illustrating clusters of different types of errors or issues, including null pointer, unhandled exceptions, and SQL injections. The plot 500 illustrates data points (in different shades of gray) which have certain common characteristics X and Y as plotted. The characteristics X and Y may include error types, performance metrics, occurrence frequency, etc.

The code change suggestion logic 344-2 has access to the microservice source code 344-3 as well as the pattern classification logic 344-1. The pattern classification logic 344-1, implementing the classifier stage, provides information to the code change suggestion logic 344-2 about the context of an issue or error reported from the trigger engine 442-1. Using the classification results, the rules engine 444 of the code change suggestion logic 344-2 starts processing the data generated by the parsers 340 and pre-defined rules will run on top of the data set to generate the recommendations for modifying the source code of the first version microservice 322-1 to generate the second version microservice 322-2. The rules engine 444 has predefined remedies (e.g., which are fed by SMEs into the rules engine 444, which are learned over time, etc.). The role of the rules engine 444 is to detect the area of the problem and start providing fixes using the remedies provisioned in the rules engine 444.

In some embodiments, remedies are updated to follow specific guidelines, if applicable, such that the code change suggestion logic 344-2 can read the remedy and update the code automatically by reading the rule. The following guidelines may be used:

(1) If new code is to be added before the line of an exception, then prefix the code snippet with B: (e.g., "before");

(2) If new code is to be added after the line of an exception, then prefix the code snippet with A: (e.g., "after");

(3) If new code is to be added after the end of a class, then prefix the code snippet with E: (e.g., "end");

(4) If a line of an exception needs to be replaced with another code snippet, prefix with R: (e.g., "replace");

(5) If a specific line is to be replaced with a new code snippet, utilize R<Line Number>: (e.g., "replace <Line Number>");

(6) If new code is to be added before a specific line, then prefix the code snippet with B<Line Number" (e.g., "before <Line Number>");

(7) If new code is to be added after a specific line, then prefix the code snippet with A: <Line Number> (e.g., "after <Line Number>");

(8) If a suggestion cannot be applied using one of (1)-(7), then specify the suggested code as a prefix by C<Line Number>: (e.g., "comment <Line Number>").

Implementation of the code change suggestion logic 344-2 will now be described with respect to the examples of FIGS. 6A-6D and 7A-7D. An example of application of a rule for unhandled exceptions will now be described with respect to FIGS. 6A-6D. FIG. 6A shows a rule 600 created in the knowledge base 142 for a divide by zero unhandled exception in the C# language. With this rule, a try block is added before the code snippet having the divide by zero exception, and a catch block is added at the end of the class having the divide by zero exception. FIG. 6B shows an example of code 605 for a console application with a microservice method "DivideMe" where the caller may sometimes call "j=0" which will throw an unhandled exception.

FIG. 6C shows an event viewer 610 with log details for the unhandled exception. The first occurrence of the exception in the current file ("Program.cs") is in the line 23. The log parser 340-1 will parse the first line of the exception to get the exception type as "unhandled exception" and the category as "System. DivideByZeroException" with the line of the exception being 23. After a predefined threshold level or number of occurrences of the exception in a particular environment (e.g., such as twenty within one day), the microservice will trigger (e.g., via the trigger engine 442-1) to adapt the error and generate new code using the code change suggestion logic 344-2. The code change suggestion logic 344-2 will query the data store 442-2 of the knowledge base 142 with the runtime exception type and category, to return the remedy specified in rule 600 (e.g., insert the code snippet against prefix B: before the line of exception (23), and add E: after the line of the exception). The code change suggestion logic 344-2 will get the microservice source code 344-3 for the class (e.g., Program.cs) and generate the code in accordance with the rule as shown in the updated code 615 of FIG. 6D. The second version microservice 322-2 may utilize the suggestion (e.g., the updated code 615), such that it will not result in the unhandled exception and hang in an unpredictive way.

Figure 7C:
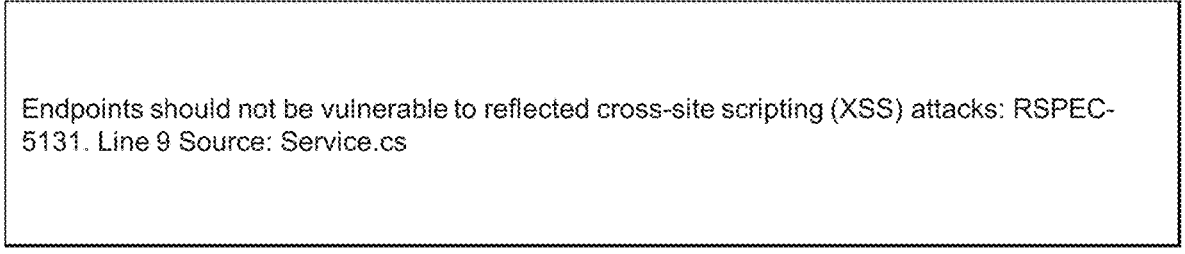

It should be noted that not all exceptions and vulnerability scenarios may be handled by automatic changes in the source code. For recurring exceptions or dynamic security vulnerability scenarios which cannot be handled through automatic regenerative code changes, the code change suggestion logic 344-2 may point out the line number in the code that is a likely source of one or more issues or errors, and a suggested remedy may be included as comments in the code at that location. At the time of accepting the second version microservice 322-2, a developer can choose whether to accept a particular code change suggestion. FIGS. 7A-7D illustrate an example where a code suggestion is inserted as comments in the source code. FIG. 7A shows an example rule 700 for an error type (e.g., an XSS security vulnerability). The remedy here is to add a comment in the method (e.g., at C: <Line Number>) with a suggested code snippet. FIG. 7B shows an example of the code 705 having a security vulnerability which triggers the rule 700.

FIG. 7C shows the event viewer 710, which indicates the error from the security scan (e.g., endpoints should not be vulnerable to XSS attacks, RSPEC-5131, Line 9 Source: Service.cs). The scan parser 340-4 will parse event viewer 710 and get the appropriate specification (e.g., RSPEC-5131) against the knowledge base 142 for a remedy for this vulnerability. The rule 700 provides the remedy as "System. Web.Security. AntiXss.AntiXssEncoder.HtmlEncode (<object>, true);" with the prefix marker being C<Line Number> (e.g., meaning that the remedy is to be given as a comment at the line number where the vulnerability occurs). In this specific example, after the line number 9, a C#comment will be added with a suggested remedy, where <object> will be replace with the object result line 9 of Service.cs (e.g., "name"). FIG. 7D shows the suggested code revision 715, where the developer can choose whether to adopt the suggestion (e.g., by removing the comment tags to deploy the suggestion in the second version microservice 322-2).

The newly evolved version, the second version microservice 322-2, is based on the exceptions, errors and scan results that occurred while executing the first version microservice 322-1 in a particular environment. The second version microservice 322-2 may include source code which is a combination of the auto-updated modified code as well as the code suggestions. The developer can then just accept the suggestions with negligible effort. FIGS. 8A and 8B show source code files 800 and 805 before and after application of the code change suggestion logic 344-2. Advantageously, the microservice code regeneration logic 144 is capable of adaptive self-code correction of microservices to address some of the anomalies encountered during execution of microservices in particular environment. Self-upgrade of microservices is thereby enabled, through automatic code changes or suggestions for modifying code (e.g., as comments in evolved versions of the microservices). In this way, microservices may be evolved to new versions based on learning in different execution conditions.

It is to be appreciated that the particular advantages described above and elsewhere herein are associated with particular illustrative embodiments and need not be present in other embodiments. Also, the particular types of information processing system features and functionality as illustrated in the drawings and described above are exemplary only, and numerous other arrangements may be used in other embodiments.

Illustrative embodiments of processing platforms utilized to implement functionality for automated generation of additional versions of microservices will now be described in greater detail with reference to FIGS. 9 and 10. Although described in the context of system 100, these platforms may also be used to implement at least portions of other information processing systems in other embodiments.

Figure 9:
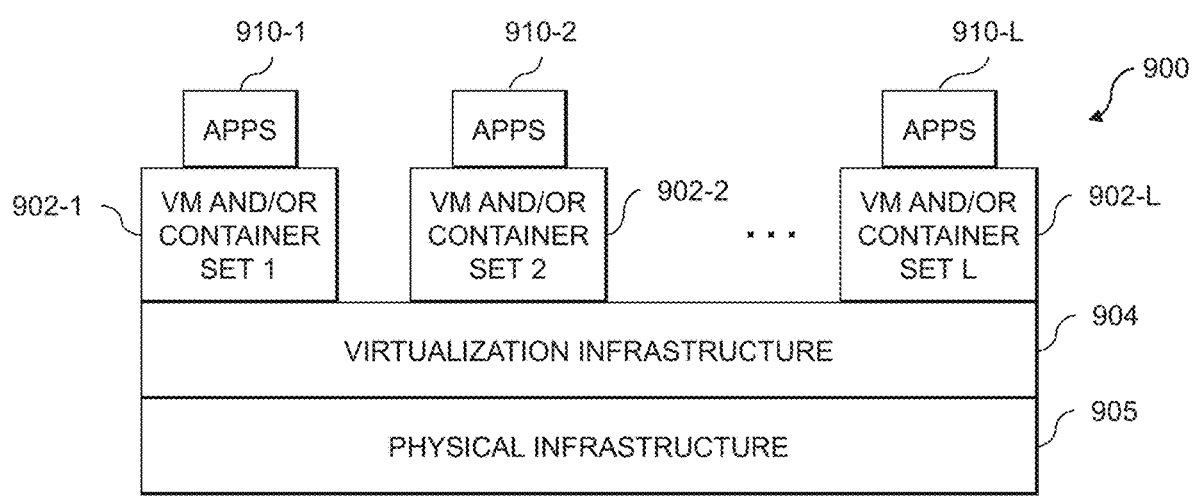
FIGS. 9 and 10 show examples of processing platforms that may be utilized to implement at least a portion of an information processing system in illustrative embodiments.
Figure 10:
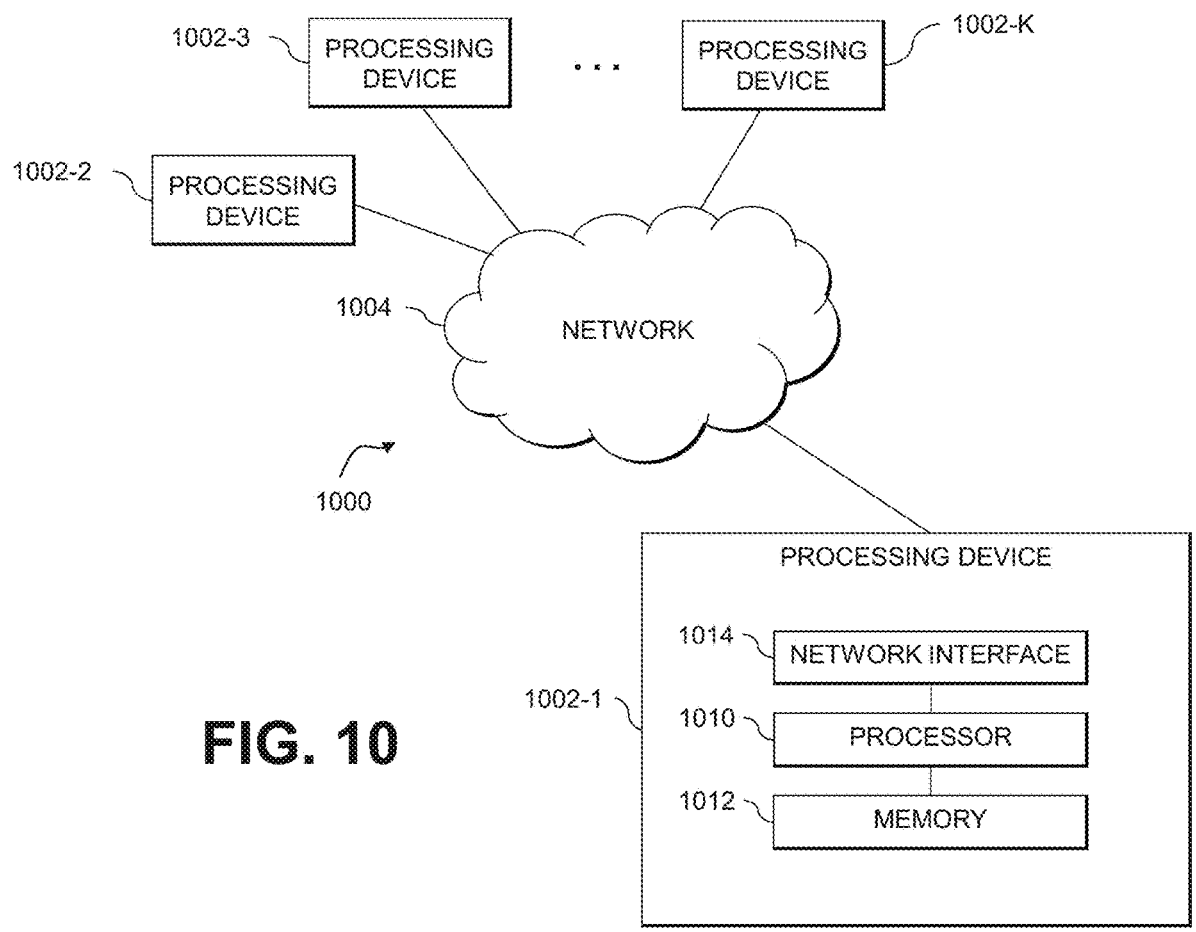

FIG. 9 shows an example processing platform comprising cloud infrastructure 900. The cloud infrastructure 900 comprises a combination of physical and virtual processing resources that may be utilized to implement at least a portion of the information processing system 100 in FIG. 1. The cloud infrastructure 900 comprises multiple virtual machines (VMs) and/or container sets 902-1, 902-2, . . . 902-L implemented using virtualization infrastructure 904. The virtualization infrastructure 904 runs on physical infrastructure 905, and illustratively comprises one or more hypervisors and/or operating system level virtualization infrastructure. The operating system level virtualization infrastructure illustratively comprises kernel control groups of a Linux operating system or other type of operating system.

The cloud infrastructure 900 further comprises sets of applications 910-1, 910-2, . . . 910-L running on respective ones of the VMs/container sets 902-1, 902-2, . . . 902-L under the control of the virtualization infrastructure 904. The VMs/container sets 902 may comprise respective VMs, respective sets of one or more containers, or respective sets of one or more containers running in VMs.

In some implementations of the FIG. 9 embodiment, the VMs/container sets 902 comprise respective VMs implemented using virtualization infrastructure 904 that comprises at least one hypervisor. A hypervisor platform may be used to implement a hypervisor within the virtualization infrastructure 904, where the hypervisor platform has an associated virtual infrastructure management system. The underlying physical machines may comprise one or more distributed processing platforms that include one or more storage systems.

In other implementations of the FIG. 9 embodiment, the VMs/container sets 902 comprise respective containers implemented using virtualization infrastructure 904 that provides operating system level virtualization functionality, such as support for Docker containers running on bare metal hosts, or Docker containers running on VMs. The containers are illustratively implemented using respective kernel control groups of the operating system.

As is apparent from the above, one or more of the processing modules or other components of system 100 may each run on a computer, server, storage device or other processing platform element. A given such element may be viewed as an example of what is more generally referred to herein as a "processing device." The cloud infrastructure 900 shown in FIG. 9 may represent at least a portion of one processing platform. Another example of such a processing platform is processing platform 1000 shown in FIG. 10.

The processing platform 1000 in this embodiment comprises a portion of system 100 and includes a plurality of processing devices, denoted 1002-1, 1002-2, 1002-3, . . . 1002-K, which communicate with one another over a network 1004.

The network 1004 may comprise any type of network, including by way of example a global computer network such as the Internet, a WAN, a LAN, a satellite network, a telephone or cable network, a cellular network, a wireless network such as a WiFi or WiMAX network, or various portions or combinations of these and other types of networks.

The processing device 1002-1 in the processing platform 1000 comprises a processor 1010 coupled to a memory 1012.

The processor 1010 may comprise a microprocessor, a microcontroller, an application-specific integrated circuit (ASIC), a field-programmable gate array (FPGA), a central processing unit (CPU), a graphical processing unit (GPU), a tensor processing unit (TPU), a video processing unit (VPU) or other type of processing circuitry, as well as portions or combinations of such circuitry elements.

The memory 1012 may comprise random access memory (RAM), read-only memory (ROM), flash memory or other types of memory, in any combination. The memory 1012 and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM, flash memory or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 1002-1 is network interface circuitry 1014, which is used to interface the processing device with the network 1004 and other system components, and may comprise conventional transceivers.

The other processing devices 1002 of the processing platform 1000 are assumed to be configured in a manner similar to that shown for processing device 1002-1 in the figure.

Again, the particular processing platform 1000 shown in the figure is presented by way of example only, and system 100 may include additional or alternative processing platforms, as well as numerous distinct processing platforms in any combination, with each such platform comprising one or more computers, servers, storage devices or other processing devices.

For example, other processing platforms used to implement illustrative embodiments can comprise converged infrastructure.

It should therefore be understood that in other embodiments different arrangements of additional or alternative elements may be used. At least a subset of these elements may be collectively implemented on a common processing platform, or each such element may be implemented on a separate processing platform.

As indicated previously, components of an information processing system as disclosed herein can be implemented at least in part in the form of one or more software programs stored in memory and executed by a processor of a processing device. For example, at least portions of the functionality for automated generation of additional versions of microservices as disclosed herein are illustratively implemented in the form of software running on one or more processing devices.

It should again be emphasized that the above-described embodiments are presented for purposes of illustration only. Many variations and other alternative embodiments may be used. For example, the disclosed techniques are applicable to a wide variety of other types of information processing systems, container environments, microservices, etc. Also, the particular configurations of system and device elements and associated processing operations illustratively shown in the drawings can be varied in other embodiments. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. An apparatus comprising:
at least one processing device comprising a processor coupled to a memory;
the at least one processing device being configured to perform steps of:
 detecting one or more issues associated with execution of a first version of a microservice in one or more computing environments;
 determining whether any of the detected one or more issues correspond to one or more triggers, the one or more triggers being associated with one or more predefined patterns in a knowledge base;
 responsive to determining that at least one of the detected one or more issues corresponds to at least one of the one or more triggers associated with at least one of the one or more predefined patterns in the knowledge base, utilizing one or more code modification data structures specified in the at least one of the one or more predefined patterns to modify source code of the microservice to generate modified source code;
generating at least one additional version of the microservice utilizing the modified source code; and
deploying the at least one additional version of the microservice in at least one of the one or more computing environments;
wherein the detecting the one or more issues associated with the execution of the first version of the microservice in the one or more computing environments comprises detecting two or more different subsets of the one or more issues resulting from the execution of the first version of the microservice in two or more different computing environments, the two or more different computing environments comprising at least one of different software configurations and different hardware configurations, the two or more different subsets of the one or more issues comprising a first subset of the one or more issues resulting from the execution of the first version of the microservice in a first one of the two or more different computing environments and a second subset of the one or more issues resulting from the execution of the first version of the microservice in a second one of the two or more different computing environments;
wherein the generating the at least one additional version of the microservice utilizing the modified source code comprises generating two or more different additional versions of the microservice for deployment in the two or more different computing environments, the two or more different additional versions of the microservice comprising a first additional version of the microservice and a second additional version of the microservice;
wherein the first additional version of the microservice is configured to address the first subset of the one or more issues resulting from the execution of the first version of the microservice in the first one of the two or more different computing environments; and
wherein the second additional version of the microservice is configured to address the second subset of the one or more issues resulting from the execution of the first version of the microservice in the second one of the two or more different computing environments.

2. The apparatus of claim 1 wherein the first one of the two or more different computing environments comprises a test environment, and wherein the second one of the two or more different computing environments comprises a production environment.

3. The apparatus of claim 1 wherein the first one of the two or more different computing environments comprises a first container instance running on a first container host device having a first set of compute, storage, memory and network resources, and wherein the second one of the two or more different computing environments comprises a second container instance running on a second container host device having a second set of compute, storage, memory and network resources different than the first set of compute, storage, memory and network resources.

4. The apparatus of claim 1 wherein the utilizing the one or more code modification data structures specified in the at least one of the one or more predefined patterns to modify the source code of the microservice comprises:

generating first modified source code of the microservice based at least in part on a first set of the one or more predefined patterns in the knowledge base having a first set of triggers that correspond to the first subset of the one or more issues resulting from the execution of the first version of the microservice in the first one of the two or more different computing environments; and
generating second modified source code of the microservice based at least in part on a second set of the one or more predefined patterns in the knowledge base having a second set of triggers that correspond to the second subset of the one or more issues resulting from the execution of the first version of the microservice in the second one of the two or more different computing environments.

5. The apparatus of claim 4 wherein:
the first additional version of the microservice is generated utilizing the first modified source code and the second additional version of the microservice is generated utilizing the second modified source code; and
the first additional version of the microservice is deployed in the first one of the two or more different computing environments and the second additional version of the microservice is deployed in the second one of the two or more different computing environments.

6. The apparatus of claim 5 wherein the deploying the at least one additional version of the microservice in the at least one of the one or more computing environments comprises at least one of:
deploying the first additional version of the microservice in at least a third one of the two or more different computing environments sharing a first set of one or more common characteristics with the first one of the two or more different computing environments; and
deploying the second additional version of the microservice in at least a fourth one of the two or more different computing environments sharing a second set of one or more common characteristics with the second one of the two or more different computing environments.

7. The apparatus of claim 6 wherein the first set of one or more common characteristics comprise at least a threshold similarity in available amount of compute, storage, memory and network resources.

8. The apparatus of claim 1 wherein the utilizing the one or more code modification data structures specified in the at least one of the one or more predefined patterns to modify the source code of the microservice comprises adding the one or more code modification data structures in the source code.

9. The apparatus of claim 1 wherein the utilizing the one or more code modification data structures specified in the at least one of the one or more predefined patterns to modify the source code of the microservice comprises adding the one or more code modification data structures as suggestions via comments in the source code.

10. The apparatus of claim 1 wherein the detecting the two or more different subsets of the one or more issues resulting from the execution of the first version of the microservice in the two or more different computing environments comprises parsing one or more logs generated by the first version of the microservice executing in the two or more different computing environments, parsing a memory heap of memory in the two or more different computing environments in which the first version of the microservice executes, parsing an event viewer comprising events generated by the first version of the microservice executing in the two or more different computing environments, and parsing one or more security vulnerability scan results executing in the two or more different computing environments.

11. The apparatus of claim 1 wherein each of the one or more predefined patterns in the knowledge base comprise an indication of a source code programming language utilized by the first version of the microservice, an issue type, a specific issue, and an issue log.

12. The apparatus of claim 1 wherein the one or more code modification data structures specified in the at least one of the one or more predefined patterns comprises a set of rules for utilizing code snippets to modify the source code of the microservice.

13. The apparatus of claim 12 wherein each of the set of rules for utilizing the code snippets to modify the source code of the microservice specifies at least one of:
  a first location where at least one of the code snippets is to be inserted in the source code;
  a portion of existing source code that is to be replaced with at least one of the code snippets; and
  a second location where comments are to be inserted in the source code, the comments comprising suggestions for at least one of inserting the at least one of the code snippets and replacing the portion of existing source code with the at least one of the code snippets.

14. A computer program product comprising a non-transitory processor-readable storage medium having stored therein program code of one or more software programs, wherein the program code when executed by at least one processing device causes the at least one processing device to perform steps of:
  detecting one or more issues associated with execution of a first version of a microservice in one or more computing environments;
  determining whether any of the detected one or more issues correspond to one or more triggers, the one or more triggers being associated with one or more predefined patterns in a knowledge base;
  responsive to determining that at least one of the detected one or more issues corresponds to at least one of the one or more triggers associated with at least one of the one or more predefined patterns in the knowledge base, utilizing one or more code modification data structures specified in the at least one of the one or more predefined patterns to modify source code of the microservice to generate modified source code;
  generating at least one additional version of the microservice utilizing the modified source code; and
  deploying the at least one additional version of the microservice in at least one of the one or more computing environments;
  wherein the detecting the one or more issues associated with the execution of the first version of the microservice in the one or more computing environments comprises detecting two or more different subsets of the one or more issues resulting from the execution of the first version of the microservice in two or more different computing environments, the two or more different computing environments comprising at least one of different software configurations and different hardware configurations, the two or more different subsets of the one or more issues comprising a first subset of the one or more issues resulting from the execution of the first version of the microservice in a first one of the two or more different computing environments and a second subset of the one or more issues resulting from the execution of the first version of the microservice in a second one of the two or more different computing environments; and
  wherein the generating the at least one additional version of the microservice utilizing the modified source code comprises generating two or more different additional versions of the microservice for deployment in the two or more different computing environments, the two or more different additional versions of the microservice comprising a first additional version of the microservice and a second additional version of the microservice;
  wherein the first additional version of the microservice is configured to address the first subset of the one or more issues resulting from the execution of the first version of the microservice in the first one of the two or more different computing environments; and
  wherein the second additional version of the microservice is configured to address the second subset of the one or more issues resulting from the execution of the first version of the microservice in the second one of the two or more different computing environments.

15. The computer program product of claim 14 wherein the utilizing the one or more code modification data structures specified in the at least one of the one or more predefined patterns to modify the source code of the microservice comprises adding the one or more code modification data structures in the source code.

16. The computer program product of claim 14 wherein the utilizing the one or more code modification data structures specified in the at least one of the one or more predefined patterns to modify the source code of the microservice comprises adding the one or more code modification data structures as suggestions via comments in the source code.

17. A method comprising:
  detecting one or more issues associated with execution of a first version of a microservice in one or more computing environments;
  determining whether any of the detected one or more issues correspond to one or more triggers, the one or more triggers being associated with one or more predefined patterns in a knowledge base;
  responsive to determining that at least one of the detected one or more issues corresponds to at least one of the one or more triggers associated with at least one of the one or more predefined patterns in the knowledge base, utilizing one or more code modification data structures specified in the at least one of the one or more predefined patterns to modify source code of the microservice to generate modified source code;
  generating at least one additional version of the microservice utilizing the modified source code; and
  deploying the at least one additional version of the microservice in at least one of the one or more computing environments;
  wherein the detecting the one or more issues associated with the execution of the first version of the microservice in the one or more computing environments comprises detecting two or more different subsets of the one or more issues resulting from the execution of the first version of the microservice in two or more different computing environments, the two or more different computing environments comprising at least one of different software configurations and different hardware configurations, the two or more different subsets of the one or more issues comprising a first subset of the one or more issues resulting from the execution of the first version of the microservice in a first one of the two or more different computing environments and a second subset of the one or more issues resulting from the execution of the first version of the microservice in a second one of the two or more different computing environments; and wherein the generating the at least one additional version of the microservice utilizing the modified source code comprises generating two or more different additional versions of the microservice for deployment in the two or more different computing environments, the two or more different additional versions of the microservice comprising a first additional version of the microservice and a second additional version of the microservice;

wherein the first additional version of the microservice is configured to address the first subset of the one or more issues resulting from the execution of the first version of the microservice in the first one of the two or more different computing environments;

wherein the second additional version of the microservice is configured to address the second subset of the one or more issues resulting from the execution of the first version of the microservice in the second one of the two or more different computing environments; and wherein the method is performed by at least one processing device comprising a processor coupled to a memory.

18. The method of claim 17 wherein the utilizing the one or more code modification data structures specified in the at least one of the one or more predefined patterns to modify the source code of the microservice comprises adding the one or more code modification data structures in the source code.

19. The method of claim 17 wherein the utilizing the one or more code modification data structures specified in the at least one of the one or more predefined patterns to modify the source code of the microservice comprises adding the one or more code modification data structures as suggestions via comments in the source code.

20. The method of claim 17 wherein the first one of the two or more different computing environments comprises a first container instance running on a first container host device having a first set of compute, storage, memory and network resources, and wherein the second one of the two or more different computing environments comprises a second container instance running on a second container host device having a second set of compute, storage, memory and network resources different than the first set of compute, storage, memory and network resources.

* * * * *